GENERATOR OF SQUARE SYNCHRONIZING PULSES

Filed March 17, 1950 2 Sheets-Sheet 1

INVENTOR.
FRANK A. HESTER

BY

Carl V. Olson

ATTORNEY

May 11, 1954 F. A. HESTER 2,678,352

GENERATOR OF SQUARE SYNCHRONIZING PULSES

Filed March 17, 1950 2 Sheets-Sheet 2

INVENTOR.
FRANK A. HESTER
BY Carl V. Olson
ATTORNEY

Patented May 11, 1954 2,678,352

UNITED STATES PATENT OFFICE 2,678,352

GENERATOR OF SQUARE SYNCHRONIZING PULSES

Frank A. Hester, New York, N. Y., assignor to Faximile, Inc., New York, N. Y., a corporation of Delaware Application March 17, 1950, Serial No. 150,181

5 Claims. (Cl. 178—69.5)

The present invention concerns synchronizing of mechanical equipment and, in particular, methods of and means for generating accurately shaped and timed synchronizing impulses.

This application is a continuation-in-part of co-pending application Serial No. 710,030, filed on November 15, 1946.

In many types of equipment, pulses of definite size and shape must be transmitted at predetermined regular or irregular intervals to control the speed or position of other components of the system. In facsimile apparatus, for instance, one means by which recorder and transmitter motors may be properly framed and kept in synchronism requires the transmission of a square wave impulse during a certain portion of each revolution of the transmitter scanner drum, which is used to operate synchronizing and/or framing circuits at the recorder. In order to insure positive action from such a device, the framing impulse must be substantially square and of predetermined width, and in addition, it must be accurately timed and positioned. One method commonly employed for generating such a framing impulse has been a commutator mounted on the scanner drum shaft to generate an impulse during the time between succeeding scanned lines. With this system it has been found that frequently faulty contact is obtained due to a mechanical failure where dirty contact surfaces and other mechanical conditions result in a ragged, irregular and generally unsatisfactory synchronizing impulse. When such a faulty impulse is utilized to synchronize the receiving scanner, inaccuracies result in the framing and synchronizing which cause the recorded copy to follow an irregular path.

According to the present invention various synchronizing impulses are generated electrically which have the desired accuracy of shape and timing and the commutator or similar device operated by the transmitting scanner merely selects every $n$th pulse. The selection is carried out in such a manner that it does not affect any characteristic of the synchronizing impulse and, hence, the transmitted impulse has all the desired characteristics for such a system. While the commutator or similar contact acts as a switch to allow the synchronizing impulse to be passed on to a utilization circuit, the synchronizing impulse does not pass through the commutator and its shape and timing is independent of the commutator operation even though an imperfect contact may be made. Thus the faults inherent in the mechanical commutator system for generating an impulse are entirely eliminated and highly accurate and stable synchronizing impulses are transmitted to the equipment to be controlled.

It is therefore an object of the present invention to provide means for generating periodic pulses which are accurately spaced in time and which are synchronized with a rotating mechanical equipment.

It is another object to provide synchronizing pulse generating means wherein imperfect brush and commutator contact does not adversely affect the accuracy and spacing of the pulses.

Pursuant to these and other objects which will be apparent to those skilled in the art, there is provided a mechanical selector switch which is driven by a synchronous motor supplied from an A.-C. source. A square wave generator supplied from the same A.-C. source converts the sine wave alternating current into a square wave alternating current, the output of the generator being connected to the plate of a thyratron tube. By reason of the common A.-C. source, the mechanical selector switch and the square wave generator operate in synchronism. The switch is closed for a duration in the order of the duration of one-half cycle of the square wave signal, and the repetition rate of the switch cycle is $1/n$th the frequency of the square wave signal. The selector switch is used to actuate a storage circuit which in turn controls the bias on the thyratron so that only every $n$th square wave positive half cycle is allowed to pass through the thyratron to generate an output pulse. In one embodiment of the invention the storage circuit includes a capacitor, and in a second embodiment the storage circuit includes a second synchronized square wave generator and a second thyratron.

Referring briefly to the drawings.

Figure 1:
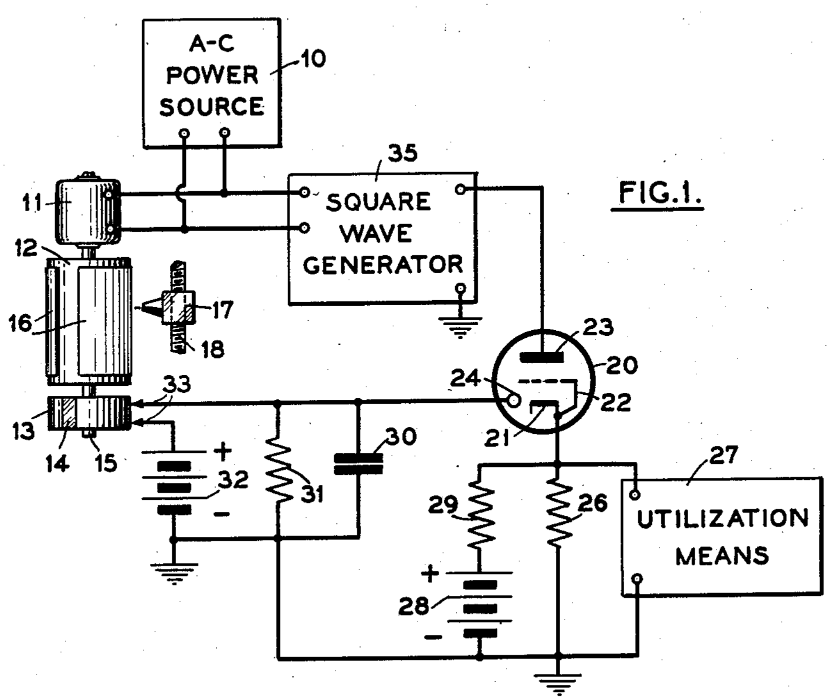
Fig. 1 is a diagram of a facsimile synchronizing signal generator constructed according to the teaching of the invention.
Figure 2:
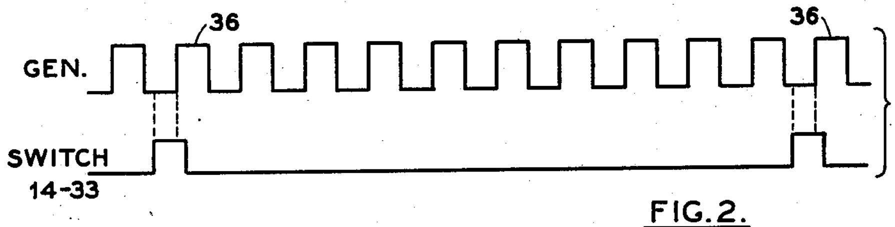
Fig. 2 is a representation of waveforms which will be used in explaining the operation of the Fig. 1 embodiment.
Figure 3:
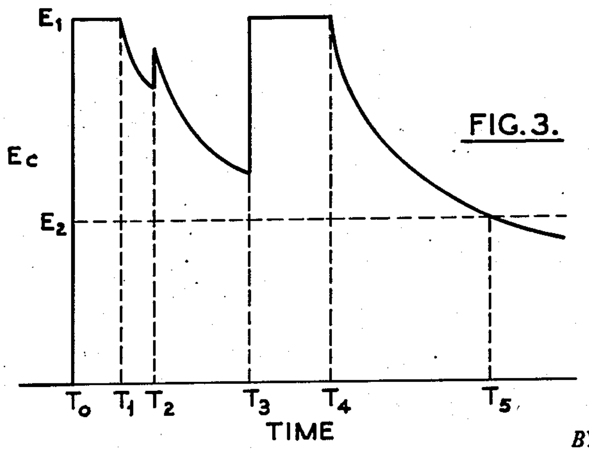
Fig. 3 is a representative chart of voltage vs. time on the storage circuit of the Fig. 1 embodiment.

Referring now in greater detail to Figs. 1, 2 and 3 of the drawings, an A.-C. power source 10 supplies a synchronous motor or gearmotor 11 which drives a facsimile copy drum 12 and a commutator 13. The commutator 13 has a single contact segment 14 oriented on the common shaft 15 in an angular position between the ends of the copy 16 wrapped around copy drum 12. A photocell pickup 17 is engaged with a rotating lead screw 18 which slowly moves the pickup along the length of copy drum 12. Each time the copy drum makes one revolution, a single line of the copy 16 is translated into an electrical signal. According to this invention, an accurately shaped and timed pulse is generated between each line of copy for transmission along with the facsimile signal to provide synchronous operation of facsimile recorders receiving the signal.

A thyratron 20 has any suitable electrode arrangement such as a cathode 21 heated by conventional means not shown, a screen or suppressor grid 22, a plate 23, and an ionization control electrode 24. An output load resistor 26 is connected between cathode 21 and ground, and a utilization means 27 is connected across resistor 26. Cathode 21 is biased positive relative to ground by means of battery 28 connected across resistors 29 and 26 acting as a voltage divider. A storage circuit comprising a capacitor 30 shunted by resistor 31 is connected between control electrode 24 and ground. A control bias battery 32 is connected on its negative side to ground and on its positive side through brushes 33 to control electrode 24. The circuit between brushes 33 is periodically closed by contact segment 14 as commutator 13 rotates.

A square wave generator 35 is supplied from A.-C. power source 10 and its output is connected across plate 23 of thyratron 20 and ground. Generator 35 is of the common type having an output synchronized with the input power and preferably is a limiter which squares up the sine wave input.

Fig. 2 shows the relationship between the output of the generator 35 and the closed circuit condition of switch 14—33. Since the synchronous motor 11 and the generator 35 are supplied from the same source 10, the generator and switch operate in synchronism. The phase displacement of the switch operation relative to the generator output is determined by the angular position of commutator 13 on shaft 15. This displacement is selected so that the switch 14—33 is closed from a time during the negative half cycle of the generator output to a time during the following positive half cycle of the generator output. The output pulses generated across load resistor 26 correspond in duration to generator pulses 36, 36.

By way of example, if the A.-C. power source 10 is 60 cycles per second, and the output of the generator 35 is 60 cycles per second, and the drum 12 and commutator 13 are run at 360 revolutions per minute or 6 revolutions per second, the switch 14—33 will be closed once per every $n$ cycles in the generator output, $n$ being 10. The width of each positive half cycle in the generator output will be 18 degrees in relation to the 360 degrees of angular displacement of drum 12 during one revolution.

The bias on cathode 21 of thyratron 20 is such that positive pulses applied from generator 35 to plate 23 will not fire the thyratron unless a predetermined positive control bias $E_2$ is applied to the control electrode 24. A greater positive voltage $E_1$ is applied to control electrode 24 from battery 32 when switch 14—33 is closed. Since a brush and commutator type switch cannot be relied on for long periods of time to produce a pulse which is accurate in width and time, a storage circuit is interposed between the switch and the control electrode 24 of thyratron 20.

The actual control bias on the control electrode may be as represented in Fig. 3 where the control bias from battery 32 is shown as $E_1$. Contact across brushes 33 is made from time $T_0$ to $T_1$, momentarily at time $T_2$, and from time $T_3$ to $T_4$. The contact is interrupted from time $T_1$ to $T_2$, from time $T_2$ to $T_3$ and from time $T_4$ on, these interruptions being due to faulty contact of brushes 33 on segment 14. When contact is made, capacitor 30 is charged to voltage $E_1$, and when contact is interrupted, capacitor 30 discharges through resistor 31, the components being selected to provide a time constant such that the control bias voltage is reduced below the minimum firing bias voltage $E_2$ prior to the appearance on plate 23 of the next succeeding positive half cycle from generator 35.

A positive half cycle applied to plate 23 at any time between time $T_0$ and $T_5$ will cause the thyratron 20 to fire and generate a corresponding pulse across output resistor 26. It will be understood that Fig. 3 is merely illustrative of the effect of poor electrical contact in switch 14—33. Fig. 3 shows how contact occurring at any time within a considerable period will bias thyratron 20 so that the next accurately timed positive pulse applied to plate 23 will fire the tube.

Figure 4:
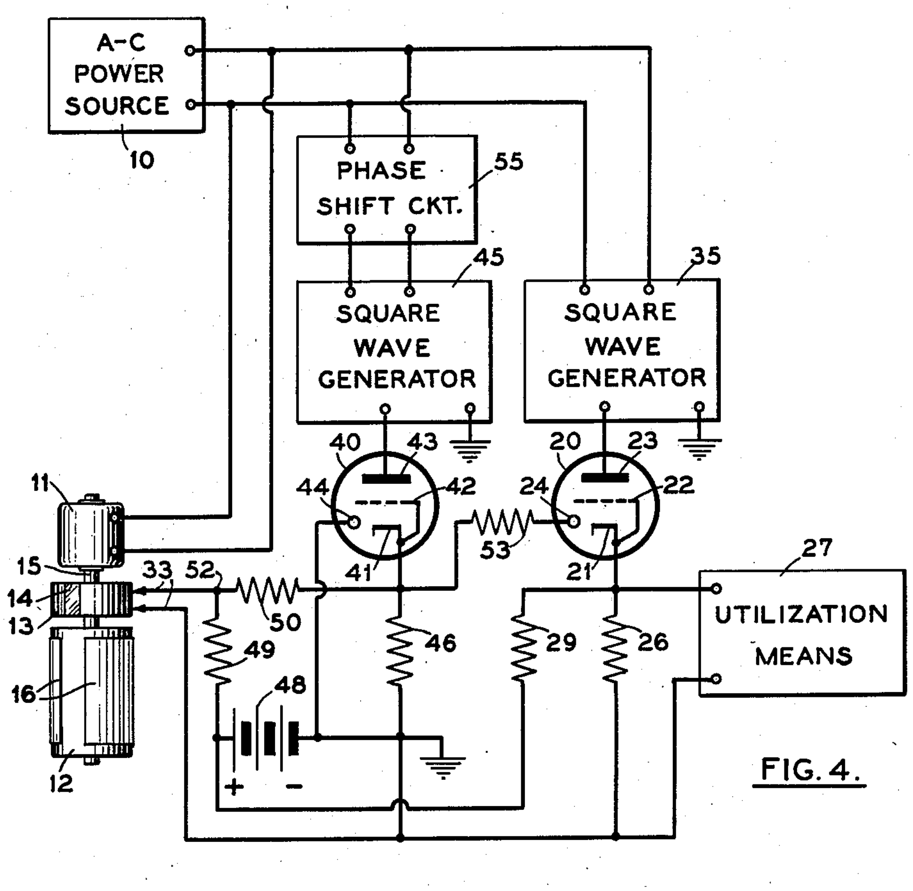
Fig. 4 is a diagram of a second embodiment of the invention.

For a description of a second embodiment of the invention, reference is now had to Fig. 4 wherein elements corresponding to elements in Fig. 1 are given the same numerals. The Fig. 4 embodiment has a different storage circuit including a second thyratron 40 having a cathode 41, a suppressor grid 42, a plate 43 and a control electrode 44, and a second square wave generator 45. Cathode 41 is connected through output resistor 46 to ground. The positive side of bias battery 48 is connected through resistors 49 and 50 to cathode 41, and the negative side is connected to ground and to control electrode 44. When contact is established across brushes 33, junction point 52 between voltage divider resistors 49 and 50 is placed at ground potential thereby reducing the bias across cathode 41 and control electrode 44 sufficiently to allow thyratron 40 to fire if a positive pulse is simultaneously applied to plate 43 from generator 45.

Battery 48 is also used to bias the cathode 21 of thyratron 20 by a connection from the positive side through voltage divider resistors 29 and 26 to ground, the negative side being connected directly to ground and through resistors 46 and 53 to the control electrode 24. The bias on thyratron 20 is such that when thyratron 40 is conducting, the voltage developed across load resistor 46 applied to control electrode 24 is sufficient to overcome the bias and allow thyratron 20 to fire on the application to plate 23 of a positive pulse from generator 35.

Figure 5:
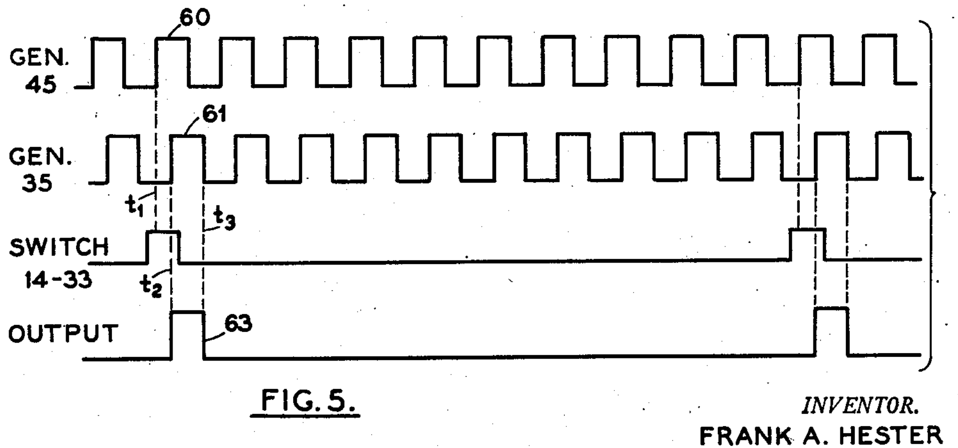
Fig. 5 is a representation of waveforms which will be used in explaining the operation of the Fig. 4 embodiment of the invention.

Square wave generator 45 is supplied from A.-C source 10 through a phase shift circuit 55. By reason of the common power supply, switch 14—33, generator 45 and generator 35 all operate in synchronism and have a phase relationship approximately as shown in Fig. 5. If switch 14—33 makes contact at any time between times $t_1$ and $t_2$, positive pulse 60 from generator 45 will fire thyratron 40 thereby conditioning thyratron 20 to fire during the time $t_2$ to $t_3$ when positive pulse 61 is applied from generator 35. The output voltage pulse 62 is developed across resistor 26. Output pulse 63 is accurately proportioned and timed regardless of the time when good contact is made by switch 14—33 during the period $t_1$ to $t_2$. It will be understood that once thyratron 20 or 40 is fired by a positive pulse on its plate, it will continue to conduct until the end of the pulse and will not conduct on the succeeding pulses because of the absence of favorable cathode-control electrode bias.

It will be apparent that the embodiments of the invention shown in Figs. 1 and 4 are similar and that they differ only in the nature of the storage means connected between switch 14—33 and thyratron 20.

While only two forms of the invention have been shown and described, many variations will be apparent to those skilled in the art which are within the spirit and scope of the invention as set forth in the appended claims.

What is claimed is:

1. In a facsimile transmitter having a rotating scanner member, means for generating a square synchronizing pulse at a time corresponding to an angular position of the scanner member comprising a square wave generator having an output frequency in cycles per second which is $n$ times the normal operating revolutions per second of the scanner member, where $n$ is an integer greater than one, an electron discharge tube receptive to said square wave generator output, a mechanical selector switch operative synchronously with the scanner member, and a storage circuit responsive to said selector switch and operative to bias the electron discharge tube so that it will conduct upon the application thereto of every $n$th positive half cycle of the square wave generator.

2. In a facsimile transmitter, means for generating a square synchronizing pulse, comprising in combination, an A.-C. power source, a square wave generator operated from and synchronously with said source, a synchronous motor operated from said source, a mechanical selector switch driven by said motor, means controlled by said switch including a storage circuit for generating one pulse per $n$ cycles of said square wave generator, where $n$ is an integer greater than one, and an electron discharge tube including a plate circuit and a control circuit, the plate circuit being receptive to the output of said square wave generator, and the control circuit being receptive to the output of said storage circuit, whereby the output of the electron discharge tube is a regularly-occurring square pulse substantially unaffected by the limitations of the mechanical selector switch.

3. In a facsimile transmitter, means operated from an A.-C. power source for generating a square synchronizing pulse between the signals corresponding to successive lines of graphic copy scanned, comprising in combination, a square wave generator operated from and synchronously with said source, a synchronous motor operated from said source, a mechanical selector switch driven by said motor, the selector switch being operative once for every $n$ cycles of said generator where $n$ is the ratio of the cycles of said source per unit of time to the lines scanned per unit of time, a storage circuit responsive to said switch, and an electron discharge tube including a plate circuit and a control circuit, the plate circuit being receptive to the output of said generator, and the control circuit being receptive to the output of said storage circuit, whereby the output of the electron discharge tube is a regularly-occurring synchronized square pulse.

4. A generator of square synchronizing pulses comprising in combination, an A.-C. power source, a square wave generator operated from and synchronously with said source, a synchronous motor operated from said source, a selector switch driven by said motor, means controlled by said switch including a storage circuit for generating one pulse per $n$ cycles of said square wave generator and a control device receptive to the output of said square wave generator, said control device including a control circuit receptive to the output of the storage circuit whereby the output of the control device is a regularly occurring substantially square synchronizing pulse.

5. A generator of square synchronizing pulses comprising in combination a square wave generator operable from and in synchronism with an A.-C. source, a synchronous motor operable from said A.-C. source, a selector switch driven by said motor, the selector switch being operative once for every $n$ cycles of said square wave generator where $n$ is an integer greater than one, a storage circuit responsive to said switch, and a control device receptive to the output of said square wave generator, said control device including a control circuit receptive to the output of said storage circuit, whereby the output of the control device is a regularly occurring substantially square synchronizing pulse.

References Cited in the file of this patent

UNITED STATES PATENTS

| Number | Name | Date |
|---|---|---|
| 2,326,740 | Artzt | Aug. 17, 1943 |
| 2,496,543 | Kanner | Feb. 7, 1950 |
| 2,512,647 | Hester | June 17, 1950 |
| 2,530,516 | Finch | Nov. 21, 1950 |
| 2,532,576 | Sherwin et al. | Dec. 5, 1950 |